United States Patent [19]

Takeda et al.

[11] 4,244,784
[45] Jan. 13, 1981

[54] CONSTRUCTION OF NUCLEAR REACTOR CORE

[75] Inventors: Renzo Takeda, Yokohama; Kunitoshi Kurihara, Sagamihara; Masaaki Yamamoto, Kokubunji; Sadao Uchikawa, Kawasaki; Michiro Yokomi, Ibaraki; Junichi Yamashita; Takanori Shimoshige, both of Hitachi, all of Japan

[73] Assignee: Hitachi, Ltd., Japan

[21] Appl. No.: 835,964

[22] Filed: Sep. 23, 1977

[30] Foreign Application Priority Data

Sep. 25, 1976 [JP] Japan .............................. 51/115268

[51] Int. Cl.² ........................................... G21C 15/02
[52] U.S. Cl. ....................................... 176/54; 176/68; 176/76; 176/78
[58] Field of Search .................. 176/17, 18, 30, 36 R, 176/73, 74, 76, 78, 84, 52-54

[56] References Cited

U.S. PATENT DOCUMENTS

| | | | |
|---|---|---|---|
| 3,166,481 | 1/1965 | Braun | 176/78 |
| 3,275,525 | 9/1966 | Bloomster et al. | 176/68 X |
| 3,745,069 | 7/1973 | Sofer et al. | 176/76 X |
| 3,799,839 | 3/1974 | Fisher et al. | 176/18 X |
| 3,986,924 | 10/1976 | Motoda | 176/17 |
| 4,040,902 | 8/1977 | Mysels | 176/84 X |

FOREIGN PATENT DOCUMENTS

| | | | |
|---|---|---|---|
| 49-78296 | 10/1974 | Japan | 176/74 |
| 1126322 | 9/1968 | United Kingdom | 176/30 |

OTHER PUBLICATIONS

Barth, et al., *Power Flattening Technique*, Nucleonics, May, 1965, pp. 72+73.
McFarlane, *Physics of Operating Pressurized Water Reactors*, Nuc. Applications & Tech., vol. 9, Nov., 1970, pp. 634-639.

*Primary Examiner*—Peter A. Nelson
*Attorney, Agent, or Firm*—Craig & Antonelli

[57] ABSTRACT

A construction of boiling water reactor core having a plurality of fuel assemblies. Some of fuel assemblies have an infinite multiplication factor which is larger at their upper regions than at their lower portions, so that the effective multiplication factor of the reactor core is larger at the upper portion than at the lower portion of the reactor core under an equal condition. Consequently, a relatively flat axial power distribution is established even under an uneven axial void distribution.

31 Claims, 10 Drawing Figures

| 5 | 4 | 4 | 3 | 3 | 3 | 4 | 5 |
|---|---|---|---|---|---|---|---|
| 4 | 3 | 2 | 2 | 1 | 1 | 3 | 4 |
| 4 | 2 | 1 | 1 | 1 | 6 | 1 | 3 |
| 3 | 2 | 1 | 1 | 7 | 1 | 1 | 3 |
| 3 | 1 | 1 | 7 | 1 | 1 | 2 | 3 |
| 3 | 1 | 6 | 1 | 1 | 1 | 2 | 4 |
| 4 | 3 | 1 | 1 | 2 | 2 | 3 | 4 |
| 5 | 4 | 3 | 3 | 3 | 4 | 4 | 5 |

| 5 | 4' | 4' | 3' | 3' | 3' | 4' | 5 |
|---|---|---|---|---|---|---|---|
| 4' | 3' | 2' | 2' | 1 | 1 | 3' | 4' |
| 4' | 2' | 1 | 1 | 1 | 6 | 1 | 3' |
| 3' | 2' | 1 | 1 | 7 | 1 | 1 | 3' |
| 3' | 1 | 1 | 7 | 1 | 1 | 2' | 3' |
| 3' | 1 | 6 | 1 | 1 | 1 | 2' | 4' |
| 4' | 3' | 1 | 1 | 2' | 2' | 3' | 4' |
| 5 | 4' | 3' | 3' | 3' | 4' | 4' | 5 |

| 45 | 44 | 43 | 43 | 43 | 43 | 43 | 45 |
|----|----|----|----|----|----|----|----|
| 44 | 42 | 42 | 41 | 41 | 41 | 42 | 43 |
| 43 | 42 | 41 | 41 | 41 | 46 | 41 | 43 |
| 43 | 41 | 41 | 41 | 7  | 41 | 41 | 43 |
| 43 | 41 | 41 | 7  | 41 | 41 | 41 | 43 |
| 43 | 41 | 46 | 41 | 41 | 41 | 42 | 43 |
| 43 | 42 | 41 | 41 | 41 | 42 | 42 | 44 |
| 45 | 43 | 43 | 43 | 43 | 43 | 44 | 45 |

FIG. 9

| 55 | 54 | 53 | 53 | 53 | 53 | 54 | 55 |
|----|----|----|----|----|----|----|----|
| 54 | 53 | 52 | 51 | 51 | 51 | 53 | 54 |
| 53 | 52 | 51 | 51 | 51 | 56 | 51 | 53 |
| 53 | 51 | 51 | 51 | 56 | 7  | 51 | 53 |
| 53 | 51 | 51 | 7  | 51 | 51 | 51 | 53 |
| 53 | 51 | 56 | 51 | 51 | 51 | 52 | 53 |
| 54 | 53 | 51 | 51 | 51 | 52 | 53 | 54 |
| 55 | 54 | 53 | 53 | 53 | 53 | 54 | 55 |

CONSTRUCTION OF NUCLEAR REACTOR CORE

LIST OF PRIOR ART REFERENCES (37 CFR 1.56 (a))

The following references are cited to show the state of the art:
- Japanese Pat. Appln. Kokai (Laid-open) No. 30790/74 Mar. 19, 1974
- Japanese Pat. Appln. Kokai (Laid-open) No. 78092/74 July 27, 1974
- Japanese Pat. Appln. Kokai (Laid-open) No. 81796/74 Aug. 7, 1974
- Japanese Pat. Kokoku (Post-Exam Publn) No. 12793/76 Apr. 22, 1976

BACKGROUND OF THE INVENTION

The present invention relates to a construction of nuclear reactor core.

In general, due to an uneven axial void distribution, the power distribution is skewed to the lower side of the reactor core, in boiling water reactors. At the same time, the power peaking is relatively steep and high.

In order to prevent this power peaking from becoming excessively steep and high, there have been made various attempts up to now. One of these conventional attempts is to shift the positions of all fuel assemblies at the time of fuel reloding (this will be referred to as "shuffling", hereinafter), so as to diminish the radial power peaking of the reactor core. Another attempt is to insert a number of control rods (these rods will be referred to as "shallow rods", hereinafter) from the lower side of the reactor core.

However, the first mentioned countermeasure consisting in shifting the positions of all fuel rods has been found inconvenient in that it considerably prolongs the time required for the fuel reloading. Also, the use of the shallow rods causes such inconveniences that the power is abruptly changed at an area close to the ends of these shallow rods and that a troublesome work becomes necessary for adjusting the depth to which the shallow rods are driven.

Further, the conventional reactor cores have suffered from many drawbacks such as difficulty in planning of the reactor core management, and so on.

SUMMARY OF THE INVENTION

It is therefore an object of the invention to provide a construction of reactor core of boiling water reactor, which can afford a relatively even axial power distribution even under an uneven axial void distribution.

It is another object of the invention to provide a construction of reactor core of boiling water reactor, which does not necessitate the shuffling of all fuel assemblies at the time of fuel reloading.

It is still another object of the invention to provide a construction of reactor core of boiling water reactor which can safely be operated without shallow rods.

To these ends, according to the invention, there is provided a construction of nuclear reactor core having a plurality of fuel assemblies in which some of the fuel assemblies have an infinite multiplication factor larger at their upper regions than at lower regions, so that the effective multiplication factor of the whole reactor core is larger at its upper region than at its lower region under an equal condition.

The difference of the infinite multiplication factors between the upper and lower regions can be provided by any one or combination of the following three methods.

The first method relies upon the axial distribution of the fuel enrichment. Namely, the fuel assembly is so constructed as to have different mean enrichments in planes normal to the axis thereof, at the upper and the lower regions. The term "enrichment" is used in this specification and claims to mean at least one of enrichment of uranium and enhancement of plutonium.

The second way relies upon the radial distribution of enrichment, rather than the mean enrichment. More specifically, the fuel assembly is so constructed that the upper region thereof has different radial enrichment distribution from that of the lower region, although the mean enrichment in planes normal to the axis of the assembly is kept almost constant over the entire length of the assembly.

Generally speaking, the pattern of enrichment distribution across the section of the fuel assembly is such that the enrichment is relatively high at the central portion than at peripheral portion. This is made so in order to prevent occurance of an excessively large local power peaking at the peripheral portion of the assembly, which is caused due to the neutron thermalization taking place at that portion because of the presence of ambient gap water of almost saturated temperature.

As a matter of practice, the fuel assembly is so designed as to put the power peak at its peripheral portions of the assembly, maintaining the level of the peripheral local power peaking within an allowable range, because the neutron importance is higher at the peripheral portion than at the central portion. Thus, it is possible to shift the position of the power peaking to the central portion by further enlarging the difference of enrichments between the central and peripheral portions of the assembly, so that the infinite multiplication factor is somewhat lowered without changing the mean enrichment across the cross-sectional plane of the assembly. It will be seen that the fuel assembly having portions of different infinite multiplication factors can be fabricated by adopting the described pattern of radial enrichment distribution for the lower region, while the upper region has the radial enrichment distribution similar to that of conventional assembly for allowing slight peripheral local power peaking.

The third way is to incorporate fuel rods containing a burnable poison. It is possible to obtain a higher infinite multiplication factor at the upper region than at the lower region of the assembly by enriching the burnable poison at the lower region than at the upper region. Gadolinea can advantageously be used as the burnable poison.

These three ways can be used solely or in combination for the described purpose.

The boundary between the upper and the lower regions is preferably located within a range of $\frac{1}{3}$ to 7/12 of the whole height of the assembly, as measured from the bottom of the latter, since such a height effectively flattens the pattern of the axial power distribution.

The above and other objects, as well as advantageous features of the invention will become clear from the following description of the preferred embodiments taken in conjunction with the attached drawings.

DETAILED DESCRIPTION OF THE PREFERRED EMBODIMENTS

Figure 1:
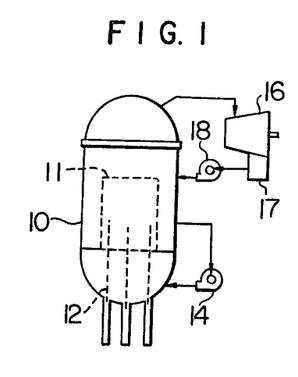
FIG. 1 is a schematic illustration of boiling water reactor.
Figure 2:
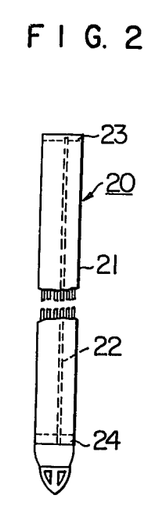
FIG. 2 is a front elevational view of a fuel assembly.

FIG. 1 shows a boiling water reactor plant having a thermal power of 2400 MW and incorporating a reactor core constructed in accordance with the invention. The plant has the reactor core 11 housed in a pressure vessel 10. A number of fuel assemblies as shown in FIG. 2 are disposed within the reactor core 11, spaced from and in parallel with one another. The reactor core 11 of this embodiment has a height of 146 inches, and the number of fuel assemblies is 560. Control rods 12 each having cross-shaped section are arranged so as to be inserted between adjacent fuel assemblies. The pressure vessel 10 is filled with coolant which is recirculated by a pump 14. The coolant is heated by the fuel assemblies and a part thereof is changed into steam which is delivered to a turbine 16 to drive the latter. The steam having expanded through the turbine 16 is condensed by a condenser 17 and is then returned to the pressure vessel 10 by means of a condensate pump 18.

The fuel assembly 20 has a tubular member 21 having a rectangular cross-section which accomodates a number of fuel rods 22 extending between an upper and a lower plates 23, 24 of the tubular member 21.

Figure 3:
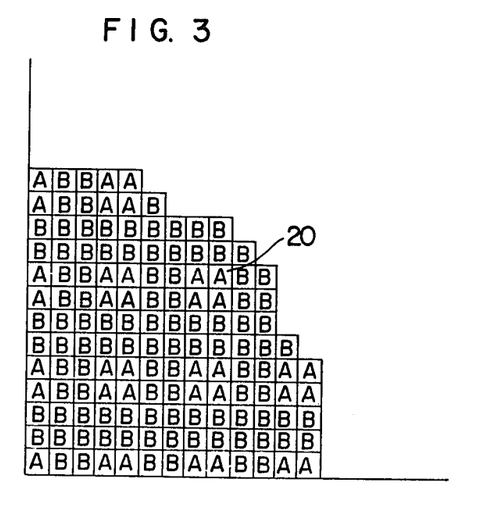
FIG. 3 is an illustration showing the arrangement of fuel assemblies in a quarter of a cross-section of a reactor core embodying the invention.

The reactor core of the described embodiment incorporates two kinds of fuel assemblies A and B disposed in a manner as shown in FIG. 3.

Figure 4A:
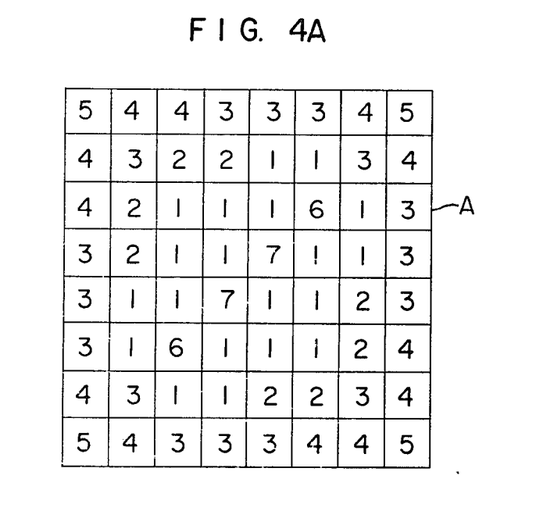
FIG. 4A and FIG. 4B are schematic cross-sectional views of fuel assemblies, showing the arrangement of fuel rods.

As will be seen from FIG. 4A, the fuel assembly A has 8×8 fuel rods disposed in the form of a square lattice. More specifically, there are six kinds of fuel rods 1, 2, 3, 4, 5 and 6 (62 in total) and two water rods 7. The six kinds of fuel rods have different enrichments of uranium as shown in the following table 1.

TABLE 1

| Nos. of Fuel Rods | | 1 | 2 | 3 | 4 | 5 | 6 |
|---|---|---|---|---|---|---|---|
| Enrichment of Uranium (% by weight) | Upper Region (Above the point 11/24 of rod from bottom) | | 2.5 | 2.1 | 1.7 | | 1.7 + 5.0% by weight of Gd$_2$O$_3$ |
| | Lower Region (Below the point 11/24 of rod from bottom) | 2.5 | 2.1 | 1.7 | 1.4 | 1.4 | |
| Number of Fuel Rods per Asembly | | 20 | 8 | 16 | 12 | 4 | 2 |

As will be seen from FIG. 4, fuel rods 1 having an enrichment of 2.5% by weight are disposed at the central portion of the fuel assembly A, while fuel rods 2, 3 and 4 disposed at the peripheral portion of the fuel assembly have their enrichments which vary at the upper and the lower regions thereof. Namely, in these peripheral fuel rods, the upper regions (above the level of 11/24 of whole height as measured from bottom) have enrichments larger than those of the lower regions (below the level of 11/24 of whole height as measured from bottom).

The fuel rods 6 contain Gadolinea (Gd$_2$O$_3$). The water rods 7 are disposed at the central portion of the assembly. The fuel assembly having the above described fuel rod arrangement exhibits a distribution of enrichment of uranium as shown in the following table 2.

TABLE 2

| | Mean Enrichments | Enrichment Distribution Across cross-section | | |
|---|---|---|---|---|
| | | Central Portion | Peripheral Portion | Difference |
| Upper Region | 2.15 | 2.39 | 1.83 | 0.56 |
| Lower Region | 1.93 | 2.39 | 1.53 | 0.86 |
| Difference | 0.22 | | | |

(Unit of Enrichment: % by weight)

In the table 2 above, the values for the central portion shows the average of values of central 14 fuel rods excluding two water rods, while the values for the peripheral portion shows the average of values of peripheral 28 fuel rods.

As will be seen from the Table 2, the upper region of the fuel assembly A has a mean enrichment larger than that of the lower region, and the differential of enrichments between the central and peripheral portions is smaller at the upper region than at the lower region. Consequently, the fuel assembly A is made to have an infinite multiplication factor which is larger at its upper region than at its lower region.

Figure 4B:
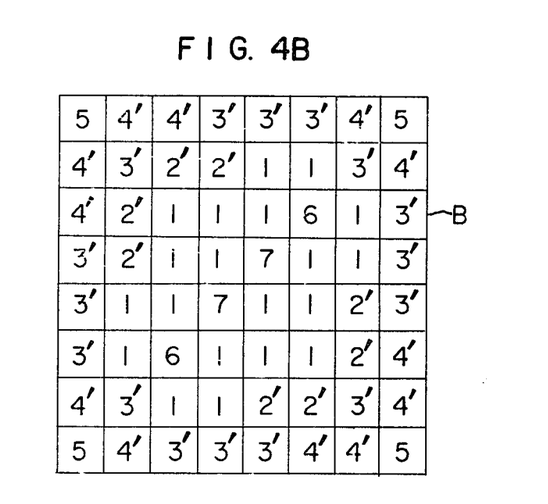

Concerning now to the fuel assembly B, fuel rods 1, 2', 3', 4', 5 and 6 which have uniform axial enrichment distribution as shown in Table 3 are disposed in a manner as shown in FIG. 4B. Thus, the fuel assembly B has an axially uniform distribution of the infinite multiplication factor.

TABLE 3

| Nos. of Fuel rods | | 1 | 2' | 3' | 4' | 5 | 6 |
|---|---|---|---|---|---|---|---|
| Enrichment of Uranium | Upper Region (Above the point 11/24 of rod from bottom) Lower Region (Below the point 11/24 of rod from bottom) | 2.5 | 2.5 | 2.1 | 1.7 | 1.4 | 1.7 + 5.0% by weight of Gd$_2$O$_3$ |
| Number of Fuel Rods per Asembly | | 20 | 8 | 16 | 12 | 4 | 2 |

(Unit of Uranium Enrichment: % by weight)

It will be seen that the adoption of fuel assemblies A has brought about a differential of effective multiplication factor, between the upper and lower regions of the reactor core in the same condition. More specifically, the effective multiplication factor of the upper region is greater than that of the lower region of the reactor core. It will be seen that a relatively uniform power distribution can be obtained when this reactor core is used, because above stated differential of effective multiplication factor is conveniently negated by axially uneven void distribution. It will be recalled here that the void fraction is greater at the upper region of the reactor core than at the lower portion, in boiling water reactors.

Figure 5:
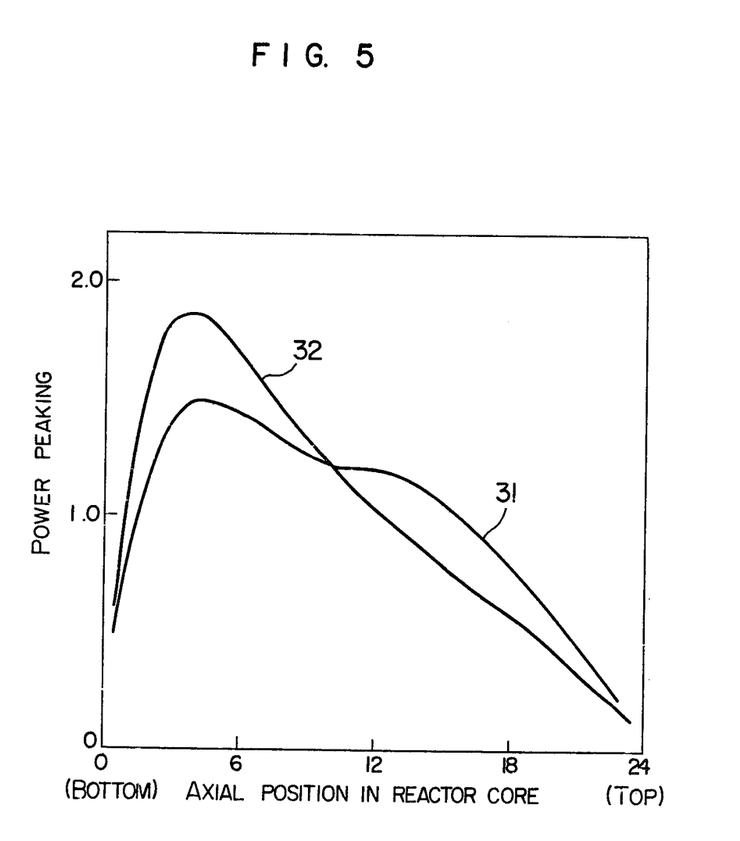
FIG. 5 is a graphical representation of an axial power distribution in reactor cores.

FIG. 5 shows the axial power distribution under the state in which all control rods are fully withdrawn, in a reactor core of the described embodiment and in a conventional reactor core which incorporates solely the fuel assemblies B. Curves 31 and 32 denote the power distribution of the invention and the prior art, respectively. It will be seen that the pattern 31 of axial power distribution in the reactor core of the invention is largely flattened, i.e. greatly improved, over the pattern 32 in the conventional reactor core which has no axially local enrichment of the uranium, in contrast to that of the invention.

It will be seen that a materially uniform axial power distribution can be obtained, when the reactor core of the invention is used, without necessitating a number of control rods. In addition, the reactor core of the invention can be operated with a simple pattern of insertion of control rods in which the control rods are driven to an equal depth.

Figure 6:
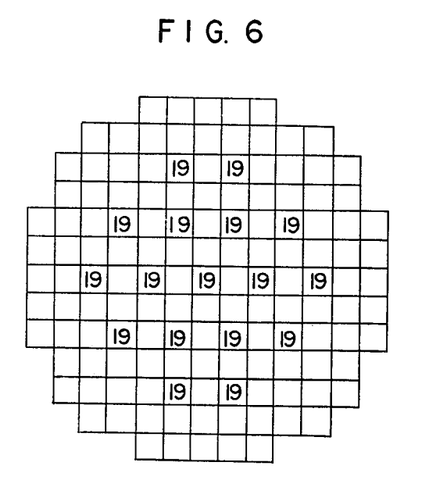
FIG. 6 is a schematic cross-sectional view of the reactor core, showing the position of insertion of control rods in the above mentioned embodiment.

FIG. 6 shows a pattern of insertion of control rods under a condition of exposure of zero.

This FIG. 6 is a cross-sectional view of the reactor core along a horizontal plane, and shows a number of squares each of which represents four fuel assemblies and a control rod disposed at the center of the square, i.e. among the fuel assemblies. The numerals provided in squares show the insertion rate of the control rods. The insertion rate represents the depth to which the control rod is inserted. Thus, the numeral 19 represents that the control rod is inserted from the bottom of the core, to the level of 19th section of axial 24 sections of the reactor core. The larger numeral gets, the deeper the control rod is inserted into the reactor core. The white blank square means that the control rod therein is fully withdrawn. It will be seen that the control rods are inserted to the same depth, presenting quite a simple pattern of insertion of control rods. In spite of this simplified pattern, the maximum linear heat generation rate of the reactor core is maintained as low as 11.3 Kw/ft.

Figure 7:
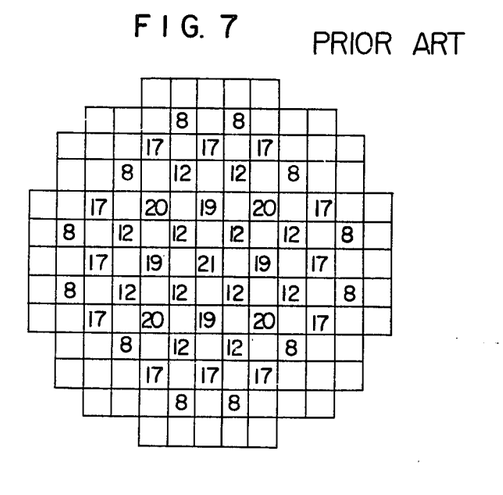
FIG. 7 is a schematic cross-sectional view of a conventional reactor core, showing the position of insertion of control rods.

By way of a reference, FIG. 7 shows a pattern of insertion of control rods generally adopted in conventional reactor core. It will be seen that the conventional reactor core necessitates a pattern of insertion of control rods which is much complicated as compared with that for the reactor core of the invention, but still allowing a maximum linear heat generation rate of 11.9 Kg/ft. Thus, the reactor core of the invention can decrease the maximum linear heat generation rate by about 0.6 Kw/ft, with a much simplified pattern of insertion of control rods.

In addition, in contrast to the conventional reactor core, the shuffling of the fuel assembly, which is indispensable in the conventional reactor core, is not required at the time of the fuel reloading. Consequently, the time required for the fuel reloading is greatly diminished. At the same time, the simplified pattern of insertion of control rods considerably facilitates the control of the reactor.

In the described embodiment, the boundary between the upper and the lower region is located at the level of 11/24 of the whole height of the core as measured from the bottom. However, this is not exclusive and the boundary may be positioned at other levels, as far as it falls within a range of between $\frac{1}{3}$ and 7/12 of the core height as measured from the bottom of the reactor core, for effectively flattening the pattern of axial distribution of the power.

It is to be noted here that the fuel assembly A can be modified in various manners.

Figure 8:
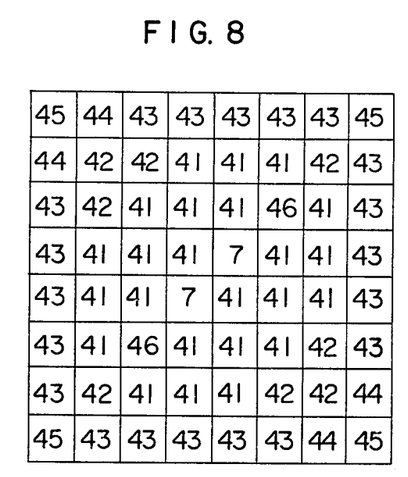
FIG. 8 is a schematic cross-sectional view of a fuel assembly used in another embodiment of the invention showing the arrangement of fuel rods.

FIG. 8 shows a modification of the fuel assembly A in which the fuel rods have enrichments as shown in the Table 4. Water rods are designated at numeral 7.

TABLE 4

| | Nos. of Fuel Rods | 41 | 42 | 43 | 44 | 45 | 46 |
|---|---|---|---|---|---|---|---|
| Enrichments of Uranium | Upper Region (Above the point 11/24 of rod from bottom) | | | 2.0 | | 1.5 | 1.5 + 5% by weight of $Gd_2O_3$ |
| | | 2.5 | 2.0 | | 1.5 | | |
| | Lower Region (Below the point 11/24 of rod from bottom) | | | | 1.5 | 1.3 | |
| Number of Fuel Rods per Assembly | | 24 | 8 | 20 | 4 | 4 | 2 |

(Unit of Enrichment of Uranium: % by weight)

The fuel assembly having fuel rods of Table 4 arranged in the manner as shown in FIG. 8 exhibits an uranium enrichment distribution as shown in the Table 5 below.

TABLE 5

| | Mean Enrichment | Enrichment Across Cross-section | | Difference |
|---|---|---|---|---|
| | | Center | Periphery | |
| Upper Region | 2.11 | 2.31 | 1.86 | 0.45 |
| Lower Region | 1.94 | 2.31 | 1.47 | 0.84 |
| Difference | 0.17 | | | |

(Enrichment of Uranium: % by weight)

The mean enrichment of the upper region is larger than that of the lower region, and the difference of the enrichments between the central and peripheral portions is smaller at the upper region than at the lower region, also in this fuel assembly, so as to present an infinite multiplication factor which is greater at the upper region than at the lower region of the fuel assembly. For instance, infinite multiplication factors of 1.126 and 1.092 were found at the upper and the lower regions of the fuel assembly, respectively, under a void fraction of coolant of 40%.

Figure 9:
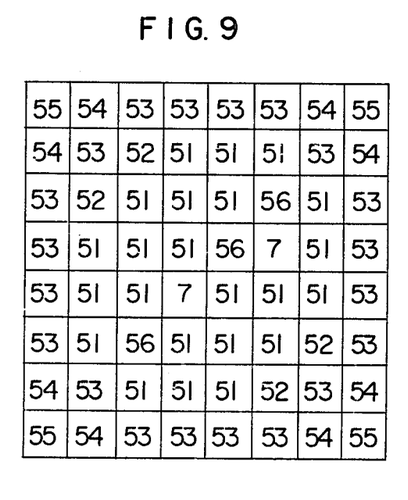
FIG. 9 is a schematic cross-sectional view of a fuel assembly used in still another embodiment of the invention, showing the arrangement of the fuel rods.

FIG. 9 shows a still another modification of the fuel assembly A in which fuel rods have enrichments as shown in Table 6 below.

TABLE 6

| | Nos. of Fuel Rods | 51 | 52 | 53 | 54 | 55 | 56 |
|---|---|---|---|---|---|---|---|
| Enrichment of Uranium | Upper Region (Above the point 11/24 of rod from bottom) | 2.7 | 2.4 | 2.4 | 2.0 | 1.6 | 1.6 + 5.0% by weight of $Gd_2O_3$ |
| | Lower Region (Below the point 11/24 of rod from bottom) | 3.3 | 3.0 | 1.8 | 1.5 | 1.2 | 1.2 + 5.0% by weight of $Gd_2O_3$ |
| Number of Fuel Rods per Assembly | | 23 | 4 | 20 | 8 | 4 | 3 |

(Unit of Enrichment of Uranium: % by weight)

The fuel assembly has an enrichment distribution as shown in the following Table 7.

TABLE 7

|  | Mean Enrichment | Enrichment Across Cross-section | | Difference |
| --- | --- | --- | --- | --- |
|  |  | Center | Periphery |  |
| Upper Region | 2.37 | 2.46 | 2.17 | 0.29 |
| Lower Region | 2.33 | 2.85 | 1.63 | 1.22 |
| Difference | 0.04 |  |  |  |

(Unit of Enrichment of Uranium: % by weight)

In this embodiment, the upper and lower regions have respective mean enrichments of 2.37% by weight and 2.33% by weight, which can be regarded as being equal.

However, the upper and the lower regions have different enrichment distributions across the cross-section of the fuel assembly. Namely, the difference of enrichment between the central and peripheral portions is small at the upper region, while, in the lower region, the difference is made large, and the peripheral enrichment is larger at the upper region than at the lower region.

Thus, in spite of the axially uniform mean enrichment distribution, the fuel assembly exhibit an infinite multiplication factor which is larger at the upper region by about 2.2% than at the lower region, because the neutron importance is higher at the peripheral portion than at the central portion.

It will be seen that the similar advantageous effect to that of the first mentioned embodiment is brought about when the fuel assemblies as shown in FIGS. 8 and 9 are used in place of the fuel assemblies A of the reactor core of FIG. 3.

The aforementioned embodiments incorporate two kinds of fuel assemblies A and B. However, it is to be understood here that the similar effect can be obtained by adopting solely the fuel assemblies A having an infinite multiplication factor which is higher at the upper region than at the lower region, over the whole area of the reactor core, and such a modification is fairly involved by the present invention.

Other changes and modifications are possible within the scope of the invention which is delimited solely by the appended claims.

What is claimed is:

1. A core construction of a boiling-water reactor comprising a plurality of fuel assemblies arranged in a pressure vessel of the reactor in which coolant flows from the bottom of the core toward the top thereof, wherein a part of said fuel assemblies are first fuel assemblies each axially divided substantially into upper and lower regions, said upper region having an enrichment larger than that of the lower region the enrichment in each of said upper and lower regions being uniformly distributed axially thereof, the boundary between said upper and lower regions being located such that when said first fuel assemblies are arranged in the core of the boiling-water reactor and the reactor has started its operation, a peak power is produced in each of said upper and lower regions, and wherein the rest of said fuel assemblies are second fuel assemblies each of which has a substantially uniform axial distribution of enrichment.

2. A core construction as set forth in claim 1, wherein the boundary between said upper and lower regions is located at a height within a range of between ⅓ and 7/12 of the whole height of said fuel assembly as measured from the bottom of the latter.

3. A core construction as set forth in claim 1, wherein said first fuel assemblies include fuel rods located in the central portion of a plane normal to the axis of the fuel assembly having an enrichment greater than that of the fuel rods located in the peripheral portion thereof, wherein the enrichment of each of the sections of the fuel rods corresponding to the upper and lower regions of the fuel assembly is uniformly distributed axially thereof, and wherein said upper region has a means enrichment greater than that of said lower region.

4. A core construction as set forth in claim 2, wherein said first fuel assemblies include fuel rods located in the central portion of a plane normal to the axis of the fuel assembly having an enrichment greater than that of the fuel rods located in the peripheral portion thereof, wherein the enrichment of each of the sections of the fuel rods corresponding to the upper and lower regions of the fuel assembly is uniformly distributed axially thereof, and wherein said upper region has a mean enrichment greater than that of said lower region.

5. A core construction as set forth in claim 2, wherein said first fuel assemblies comprise fuel rods having a uniform enrichment through the upper and lower regions, and fuel rods having an enrichment at said upper region which is greater than than the enrichment at said lower region.

6. A core construction as set forth in claim 3, wherein said first fuel assemblies comprise fuel rods having a uniform enrichment throughout the upper and lower regions, and fuel rods having an enrichment at said upper region which is greater than the enrichment at said lower region.

7. A core construction as set forth in claim 4, wherein said first fuel assemblies comprises fuel rods having a uniform enrichment throughout the upper and lower regions, and fuel rods having an enrichment at said upper region which is greater than the enrichment at said lower region.

8. A core construction as set forth in claim 1, wherein said first fuel assemblies contain gadolinium having a concentration greater in said lower region than in said upper region.

9. A core construction as set forth in claim 2, wherein said first fuel assemblies contain gadolinium having a concentration greater in said lower region than in said upper region.

10. A boiling-water nuclear reactor core construction comprising a plurality of fuel assemblies disposed with a reactor pressure vessel filled with a coolant, said fuel assemblies including first fuel assemblies having an enrichment distribution therein for maintaining an infinite multiplication factor which is larger at upper regions than at lower regions of said first fuel assemblies, wherein the effective multiplication factor of the axially upper portion of said reactor core is larger than that of the axially lower portion when these portions are placed under same conditions of operation, said fuel assemblies further including second fuel assemblies each of which having a substantially uniform axial distribution of infinite multiplication factor, the boundary between said upper and lower regions of said reactor core being located at a level between ⅓ and 7/12 of the entire core height as measured from the bottom of said reactor core, wherein each of said first fuel assemblies has a means enrichment which is larger at said upper region than at said lower region, and wherein each of said first fuel assemblies has a difference of enrichment between the central and peripheral portions of cross-sectional planes perpendicular to the axis thereof, said difference being smaller at the upper region than at the lower region of the fuel assembly.

11. A boiling-water nuclear reactor core construction as claimed in claim 16, wherein said first fuel assemblies include fuel rods which contain a burnable poison, the concentration of said burnable poison being larger at the lower region than at the upper region of each of said fuel rods.

12. A boiling-water nuclear reactor core construction comprising a plurality of fuel assemblies disposed with a reactor pressure vessel filled with a coolant, said fuel assemblies including first fuel assemblies having an enrichment distribution therein for maintaining an infinite multiplication factor which is larger at upper regions than at lower regions of said first fuel assemblies, wherein the effective multiplication factor of the axially upper portion of said reactor core is larger than that of the axially lower portion when these portions are placed under same conditions of operation, said fuel assemblies further including second fuel assemblies each of which having a substantially uniform axial distribution of infinite multiplication factor, wherein the boundary between said upper and lower regions of said reactor core being located at a level between ⅓ and 7/12 of the entire core height as measured from the bottom of said reactor core, and wherein each of said first fuel assemblies has an axially uniform distribution of mean enrichment and has a difference of enrichments between the peripheral and central portions of cross-sectional planes peripendicular to the axis thereof, said difference being smaller at the upper region that a at the lower region of said fuel assembly.

13. A boiling-water nuclear reactor core construction as claimed in claim 12, wherein said first fuel assemblies include fuel rods which contain a burnable poison, the concentration of said burnable poison being larger at the lower region than at the upper region of each of said fuel rods.

14. A core construction of a boiling-water reactor comprising a plurality of fuel assemblies arranged in a pressure vessel of the reactor in which coolant flows from the bottom of the core toward the top thereof, wherein a part of said fuel assemblies are first fuel assemblies each of which is axially divided into upper and lower regions, the upper and lower regions having different infinite multiplication factors due to a mean enrichment distribution which is at least as large in the upper region as in the lower region, each of said first fuel assemblies having a difference of enrichment between the peripheral and central portions of planes perpendicular to the axis thereof, said difference being smaller at the upper region than at the lower region of said first fuel assemblies, and wherein the rest of said fuel assemblies are second fuel assemblies each of which has a difference of enrichment between the peripheral and central portions of planes perpendicular to the axis thereof, said difference being equal at the upper region and the lower region of said second fuel assembly.

15. A core construction of a boiling-water reactor as set forth in claim 14, wherein each of said second fuel assemblies has an axially uniform distribution of enrichment.

16. A core construction as set forth in claim 14, wherein said central portion of said plane has an enrichment greater than that of the peripheral portion thereof both at said upper and lower regions of said first fuel assemblies.

17. A core construction as set forth in claim 14, wherein the boundary between said upper and lower regions is located at a height within a range of between ⅓ and 7/12 of the whole height of said first fuel assemblies as measured from the bottom of the latter.

18. A core construction as set forth in claim 16, wherein the boundary between said upper and lower regions is located at a height within a range of between ⅓ and 7/12 of the whole height of said first fuel assemblies as measured from the bottom of the latter.

19. A core construction as set forth in claim 18, wherein said upper region has a means enrichment greater than that of said lower region.

20. A core construction as set forth in claim 14, wherein said upper region has a mean enrichment greater than that of said lower region.

21. A core construction as set forth in claim 14, wherein said upper region has a mean enrichment substantially equal to that of said lower region.

22. A core construction as set forth in claim 16, wherein said upper and lower regions each have an enrichment uniformly distributed axially thereof.

23. A core construction as set forth in claim 22, wherein the boundary between said upper and lower regions is located at a height within a range of between ⅓ and 7/12 of the whole height of said first fuel assemblies as measured from the bottom of the latter.

24. A core construction as set forth in claim 22, wherein said upper region has a mean enrichment greater than that of said lower region.

25. A core construction as set forth in claim 22, wherein said upper region has a mean enrichment substantially equal to that of said lower region.

26. A core construction as set forth in claim 24, wherein said first fuel assemblies comprise fuel rods having a uniform enrichment through the upper and lower regions, and fuel rods having an enrichment at said upper region which is greater than the enrichment at said lower region.

27. A core construction as set forth in claim 23, wherein said first fuel assemblies comprise fuel rods having a uniform enrichment throughout the upper and lower regions, and fuel rods having an enrichment at said upper region which is greater than the enrichment at said lower region.

28. A construction of nuclear reactor core having a plurality of fuel assemblies disposed within a reactor pressure vessel, characterized in that a part of said fuel assemblies are first fuel assemblies each having an enrichment distribution therein to cause an infinite multiplication factor which is larger at upper regions than at lower regions of said first fuel assemblies, whereby the effective multiplication factor of the axially upper portion of said reactor core is made larger than that of the axially lower portion when these portion are under the same conditions, wherein each of said first fuel assemblies has a mean enrichment which is larger at said upper regions then at said lower regions, and said fuel assemblies include second fuel assemblies each of which has a substantially uniform axial distribution of infinite multiplication factor, wherein the boundary between said upper and lower regions of said reactor core is located at a level between ⅓ and 7/12 of the entire core height as measured from the bottom of said reactor core, and wherein each of said first fuel assemblies has a difference of enrichments between the central and peripheral portions of planes perpendicular to the axis thereof, which is smaller at the upper region than at the lower region of the fuel assembly.

29. A construction of nuclear reactor core having a plurality of fuel assemblies disposed within a reactor pressure vessel, characterized in that a part of said fuel assemblies are first fuel assemblies each having an enrichment distribution therein to cause an infinite multiplication factor which is larger at upper regions than at lower regions of said first fuel assemblies, whereby the effective multiplication factor of the axially upper portion of said reactor core is made larger than that of the axially lower portion when these portions are under the same conditions, and said fuel assemblies include second fuel assemblies each of which has a substantially uniform axial distribution of infinite multiplication factor, wherein the boundary between said upper and lower regions of said reactor core is located at a level between $\frac{1}{3}$ and 7/12 of the entire core height as measured from the bottom of said reactor core, and wherein each of said first fuel assemblies has an axially uniform distribution of mean enrichment and has a difference of enrichments between the peripheral and central portions of planes perpendicular to the axis thereof, said difference being smaller at the upper region than at the lower region of said fuel assembly.

30. A construction of nuclear reactor core as claimed in claim 28, wherein said first fuel assemblies include fuel rods which contain a burnable poison, the concentration of said burnable poison being larger at the lower region than at the upper region of each of said fuel rods.

31. A construction of nuclear reactor core as claimed in claim 29, wherein said first fuel assemblies include fuel rods which contain a burnable poison, the concentration of said burnable poison being larger at the lower region than at the upper region of each of said fuel rods.

* * * * *